United States Patent
Borer et al.

(10) Patent No.: US 12,078,850 B2
(45) Date of Patent: Sep. 3, 2024

(54) FIBER OPTIC CONNECTORS WITH FUNNEL-SHAPED BOOTS AND METHODS OF INSTALLING THE SAME

(71) Applicant: CORNING RESEARCH & DEVELOPMENT CORPORATION, Corning, NY (US)

(72) Inventors: Victor Julian Borer, Austin, TX (US); Albert De Los Santos, Georgetown, TX (US); Donald Kent Larson, Cedar Park, TX (US); Edward B. Lurie, Round Rock, TX (US); Jameson Rensloe Wright, Austin, TX (US); Donald Allen Zielinski, Jr., Austin, TX (US)

(73) Assignee: Corning Research & Development Corporation, Corning, NY (US)

( * ) Notice: Subject to any disclaimer, the term of this patent is extended or adjusted under 35 U.S.C. 154(b) by 310 days.

(21) Appl. No.: 17/472,930

(22) Filed: Sep. 13, 2021

(65) Prior Publication Data

US 2021/0405304 A1    Dec. 30, 2021

Related U.S. Application Data

(63) Continuation of application No. PCT/US2020/026517, filed on Apr. 3, 2020.

(60) Provisional application No. 62/928,825, filed on Oct. 31, 2019, provisional application No. 62/834,945, filed on Apr. 16, 2019.

(51) Int. Cl.
    *G02B 6/38*            (2006.01)

(52) U.S. Cl.
    CPC ....... *G02B 6/38875* (2021.05); *G02B 6/3846* (2013.01)

(58) Field of Classification Search
    CPC ..... G02B 6/38; G02B 6/38875; G02B 6/3846
    See application file for complete search history.

(56) References Cited

U.S. PATENT DOCUMENTS

| | | |
|---|---|---|
| 4,787,704 A | 11/1988 | Dean et al. |
| 4,812,006 A | 3/1989 | Osborn et al. |
| 5,040,867 A | 8/1991 | De et al. |

(Continued)

FOREIGN PATENT DOCUMENTS

WO     2007/050470 A1     5/2007

OTHER PUBLICATIONS

International Search Report and Written Opinion received for PCT Patent Application No. PCT/US20/26517, mailed on Jul. 6, 2020, 11 pages.

*Primary Examiner* — Tina M Wong
(74) *Attorney, Agent, or Firm* — Adam R. Weeks

(57) ABSTRACT

A fiber optic connector comprises a connector body, a ferrule, and a boot. The ferrule has a rear portion supported within the connector body and a front portion extending beyond a front end of the connector body. The boot has a front portion within the connector body and a funnel-shaped portion that extends beyond a back end of the connector body. The funnel-shaped portion defines a boot back end. Additionally, the funnel-shaped portion includes a tapered passage on an interior of the boot and a lip on an exterior of the boot. The tapered passage and the lip are curved toward each other proximate the boot back end so that the funnel-shaped portion terminates with a rounded configuration.

17 Claims, 9 Drawing Sheets

(56) References Cited

U.S. PATENT DOCUMENTS

| | | | |
|---|---|---|---|
| 5,425,119 A | 6/1995 | Lee et al. | |
| 5,748,819 A | 5/1998 | Szentesi et al. | |
| 6,179,482 B1 | 1/2001 | Takizawa et al. | |
| 7,011,454 B2 | 3/2006 | Caveney et al. | |
| 7,280,733 B2 | 10/2007 | Larson et al. | |
| 7,369,738 B2 | 5/2008 | Larson et al. | |
| 7,775,726 B2 | 8/2010 | Pepin et al. | |
| 8,070,367 B2 * | 12/2011 | Winberg | G02B 6/38875 385/75 |
| 10,185,102 B2 | 1/2019 | Sawicki et al. | |
| 10,241,279 B2 | 3/2019 | Yazaki et al. | |
| 2009/0269014 A1 | 10/2009 | Winberg et al. | |
| 2014/0079356 A1 | 3/2014 | Pepin et al. | |
| 2018/0128996 A1 | 5/2018 | Sawicki et al. | |

* cited by examiner

FIBER OPTIC CONNECTORS WITH FUNNEL-SHAPED BOOTS AND METHODS OF INSTALLING THE SAME

PRIORITY APPLICATIONS

This application is a continuation of International Application No. PCT/US20/26517, filed on Apr. 3, 2020, which claims the benefit of priority to U.S. Application No. 62/928,825, filed on Oct. 31, 2019, and U.S. Provisional Application No. 62/834,945, filed on Apr. 16, 2019, the content of these applications being relied upon and incorporated herein by reference in entirety.

BACKGROUND

This disclosure relates generally to optical connectivity, and more particularly to fiber optic connectors having funnel-shaped boots that terminate with a rounded configuration.

Optical fibers are useful in a wide variety of applications, including the telecommunications industry for voice, video, and data transmissions. In a telecommunication system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating the optical fiber(s) of a fiber optic cable is sometimes referred to as "connectorization." Connectorization can be done in a factory, resulting in a "pre-connectorized" or "pre-terminated" fiber optic cable, or the field (e.g., using a "field-installable" fiber optic connector).

Regardless of where termination occurs, a fiber optic connector ("connector") typically includes a ferrule with one or more bores that each receive an optical fibers. The ferrule supports and positions the optical fiber(s) with respect to a body of the connector. When the connector is inserted into an adapter to mate with another connector, a retention mechanism (e.g., latch) associated with the connector body engages the adapter to hold the connector in place. An alignment mechanism, such as a sleeve within the adapter, receives or otherwise positions the ferrule so that the optical fiber(s) in the ferrule can be aligned with the optical fiber(s) supported by a ferrule of the mating connector.

The connector body is sufficiently rigid so that the connector can withstand a variety of forces during use without affecting the optical connection that may be or has been established. Because the fiber optic cable on which a connector is installed typically has a much lower stiffness than the connector body, there is a potential for the cable to bend sharply at the back end of the connector body. Such bending may result in the cable having a bend radius less than a minimum bend radius that must be maintained for the optical fiber(s) within the cable to function properly (e.g., avoid excessive attenuation resulting from the bend radius). As a result, connectors typically include a flexible, strain-relieving boot that snaps onto the connector body and extends rearwardly over a portion of the cable. The boot provides a transition in stiffness between the connector body and the cable to reduce the potential for stress concentrations and sharp bending at the back of the connector body.

Although the boot of a connector may relieve strain induced by the cable bending at the back end of the connector body, it does not address strain in an axial direction. A separate mechanism/design feature is typically needed to ensure that forces applied in the axial direction do not adversely affect how the optical fiber(s) of the cable are secured to the connector. The optical fiber(s) of the cable may be secured to the ferrule bore using an adhesive, as mentioned above, or to some other component within the connector body using adhesive or other techniques (e.g., mechanical clamping). The latter is common in many types of field-installable connectors, where the optical fiber(s) from the cable are mechanically spliced to a corresponding short "stub fiber" within the connector body. The stub fiber is secured to and processed with the ferrule in the factory so that polishing the end faces of the ferrule and a fiber need not be performed by the installer in the field. Regardless of whether the optical fiber(s) of a cable are secured to the ferrule or a component within the connector body, the axial "pull-out" forces that the optical fiber(s) can withstand are typically less than what axial forces may be imparted by the cable during use. To prevent the transfer of such axial forces to the optical fiber(s), strength elements of the cable (e.g., aramid yarn) are typically secured to the connector body by a crimp band, threaded retainer, or the like.

There are several challenges associated with having both a boot for bending strain relief and a separate feature/mechanism for axial strain relief. For example, such arrangements require a number of connector components, which also has an impact on cost and installation complexity. A greater number of installation steps may increase the potential for error. For example, the boot of a connector is typically slid onto the cable before assembling the optical fiber(s) of the cable with the other connector components (e.g., connector body and ferrule). Once the optical fiber(s) are secured within the ferrule and/or connector body, the axial strain relief mechanism is then applied. As mentioned above, this typically involves securing strength elements of the cable to the connector body. The boot is then advanced to snap on or otherwise attach to the connector body. In some instances, however, the installer forgets to slide the boot onto the cable before proceeding with the installation. The installer may not realize this until after applying the axial strain relief mechanism. Because the axial strain relief mechanism is often irreversible (e.g., crimping the strength members to the connector body cannot be undone), it may be necessary to cut the connector off the cable, discard the connector as scrap, and begin the installation process over again with a new connector.

SUMMARY

Embodiments of fiber optic connectors are provided in this disclosure. According to one embodiment, a fiber optic connector comprises a connector body, a ferrule, and a boot. The connector body has a front end and a back end. The ferrule has a rear portion supported within the connector body and a front portion extending beyond the front end of the connector body. The ferrule is configured to support an optical fiber, such as an optical fiber from a cable or a stub optical fiber that is associated with the fiber optic connector. The boot has a front portion within the connector body and a funnel-shaped portion that extends beyond the back end of the connector body. The funnel-shaped portion defines a boot back end. Additionally, the funnel-shaped portion includes a tapered passage on an interior of the boot and a lip on an exterior of the boot. The tapered passage and the lip are curved toward each other proximate the boot back end so that the funnel-shaped portion terminates with a rounded configuration.

Advantageously, in some embodiments the boot may serve multiple functions. For example, the tapered passage of the funnel-shaped portion may assist with guiding an optical fiber being inserted into the back of the fiber optic connector for termination purposes. Additionally, curved surfaces of the tapered passage and lip proximate the boot back end may help maintain low optical loss during the application of side loads to an optical fiber that has been terminated with the fiber optic connector.

Further, in some embodiments, the boot may also serve as an actuating mechanism for a buffer clamp. For example, in such embodiments, the fiber optic connector may further comprise a sleeve at least partially positioned within the connector body. The sleeve includes at least one clamping member configured to apply a clamping force to a buffer portion of the optical fiber upon actuation. The boot is received over a portion of the sleeve within the connector body and configured to move from a rearward position to a forward position to actuate the at least one clamping member.

Because the boot serves multiple functions, the number of components in the fiber optic connector may be reduced compared to known designs. This, in turn, may result in lower costs and simpler termination methods.

According to some embodiments, the fiber optic connector is a "mechanical splice connector." For example, a fiber optic connector as described in the first paragraph of this section may comprise a stub optical fiber secured to the ferrule and a mechanical splice assembly at least partially received within the connector body. The stub optical fiber extends from the rear portion of the ferrule and terminates within the mechanical splice assembly.

Cable assemblies employing fiber optic connectors like those mentioned above are also disclosed. For example, according to one embodiment, a fiber optic cable assembly comprises a cable optical fiber and a fiber optic connector according to the first paragraph of this section installed on the cable optical fiber. The cable optical fiber may be the optical fiber that is ultimately supported by and secured to the ferrule of the fiber optic connector, or may be used to form a fusion or mechanical splice with a stub optical fiber that is supported by ferrule.

Methods of installing fiber optic connectors like those mentioned above are also disclosed. According to some embodiments, a method of installing a fiber optic connector according to the first paragraph of this section on an end of a cable optical fiber comprises: inserting the end of the cable optical fiber through the boot back end of the boot and into the connector body until a buffer portion of the cable optical fiber is received in the sleeve, wherein the boot is in a rearward position during said inserting; and moving the boot from the rearward position to a forward position so that the boot causes at least one clamping member of the sleeve to apply a clamping force to the buffer portion of the cable optical fiber.

Additional features and advantages will be set out in the detailed description which follows, and in part will be clear to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description explain principles and operation of the various embodiments. Features and attributes associated with any of the embodiments shown or described may be applied to other embodiments shown, described, or appreciated based on this disclosure.

DETAILED DESCRIPTION

Various embodiments will be clarified by examples in the description below. In general, the description relates to fiber optic connectors and cable assemblies including the same. The fiber optic connectors have a boot that is much shorter than conventional designs, but the boot configuration may still allow the fiber optic connectors to pass relevant side load tests. The boot may be designed to have other advantages, such as serving as a reversible actuator for a strain relief mechanism, which may further assist the connector passing various load tests.

Figure 1:
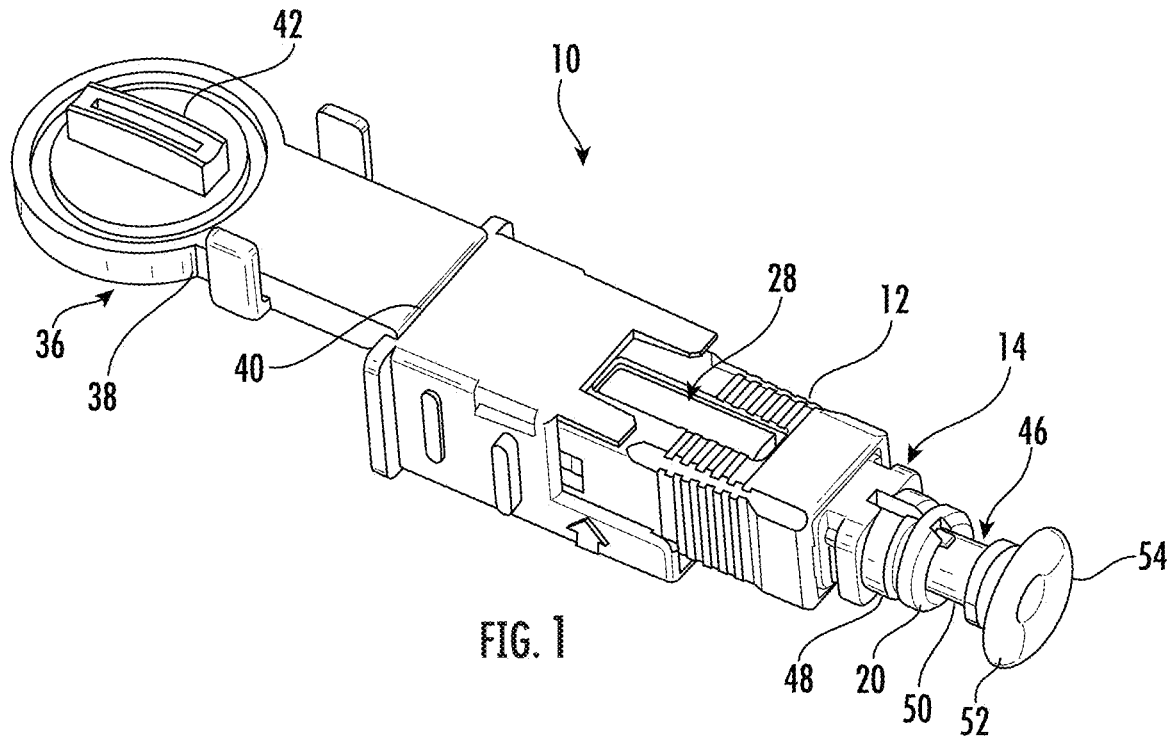
FIG. 1 is a perspective view of one example of a fiber optic connector with one example of a boot according to this disclosure, wherein a dust cap actuator tool is mounted on the fiber optic connector.
Figure 2:
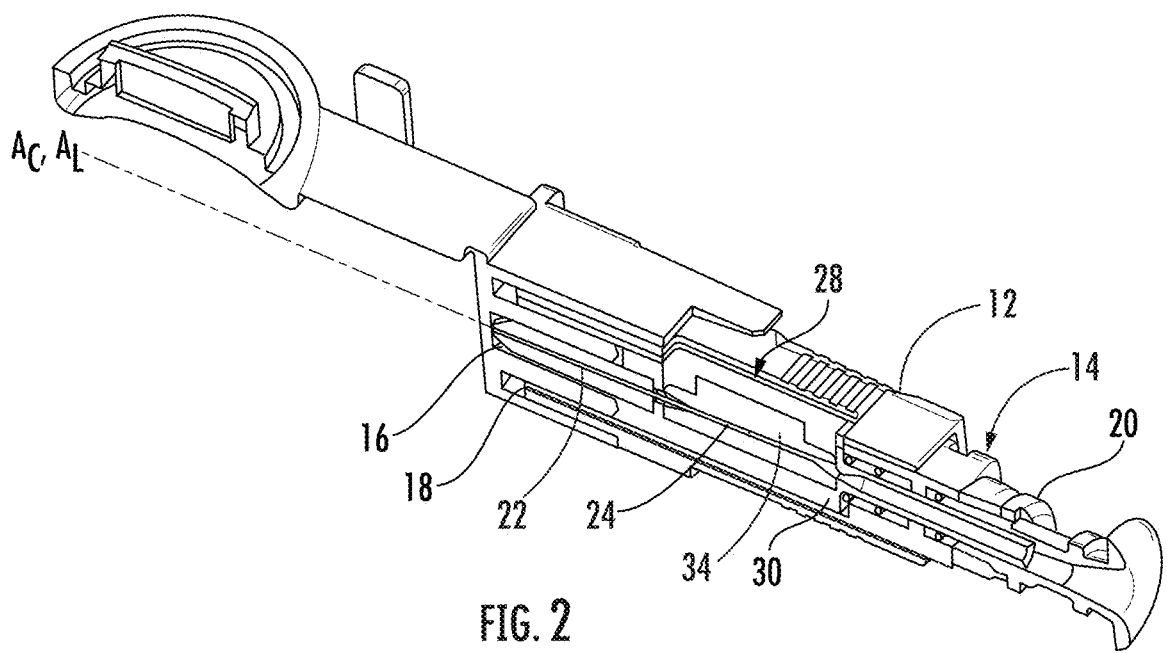
FIG. 2 is a cross-sectional view of the fiber optic connector FIG. 1.
Figure 3:
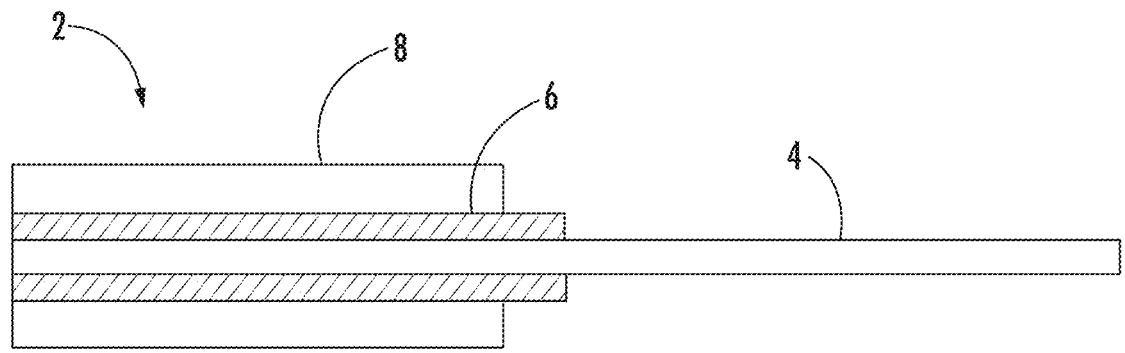
FIG. 3 is a schematic side view of an example optical fiber.

One example of a fiber optic connector 10 ("connector 10") according to this disclosure is shown in FIGS. 1 and 2, and one example of an optical fiber 2 intended to be terminated by the connector 10 is shown in FIG. 3. The connector 10 is an SC-type connector according to according to IEC 61754-4:2013, although this disclosure may be applicable to other connector types, such as LC (e.g., according to IEC 61754-20:2012) and ST-type connectors (e.g., according to IEC 61754-2:1996). And although the connector 10 will be described as having components designed to assist installation of the connector 10 in the field, this disclosure is not limited to field-installable connectors. Again, the connector 10 is merely an example; one used to provide context for a boot configuration that may be applied to other connector designs.

Similar considerations apply with respect to the optical fiber 2 (FIG. 3). That is, the optical fiber 2 is merely an example introduced to facilitate discussion. The optical fiber 2 is shown in FIG. 3 as including a bare glass portion 4, a coated portion 6, and a buffer portion 8. As is conventional, the bare glass portion 4 may have a diameter of about 125 microns. The coated portion 6 may comprise one or more polymer coating layers (e.g. acrylic material) that increase the diameter of the optical fiber 2 to about 200 microns or about 250 microns. The buffer portion 8 typically includes a layer of polymer material that is more rigid than the material that defines the coated portion 6 to provide increased mechanical strength/protection, and typically increases the diameter of the optical fiber 2 to about 900 microns. The term "optical fiber" in this disclosure may refer to a bare glass optical fiber with or without polymer coating layers.

FIG. 3 illustrates the coated portion 6 extending beyond the buffer portion 8, and the bare glass portion 4 extending beyond the coated portion 6. This may be a result of stripping lengths of material associated with the buffer portion 8 to expose the coated portion 6, and lengths of material associated with the coated portion 6 to expose an end section of the bare glass portion 4. In some embodiments, the layer(s) of material(s) associated with the coated portion 6 may have the same "strip length" as the material(s) associated with the buffer portion 8 such that the coated portion 6 does not extend beyond the buffer portion 8. Furthermore, although a buffer portion 8 is shown in FIG. 3, this disclosure includes aspects applicable to connectors installed on optical fibers that may not include a buffer portion. Again, the optical fiber 2 is merely introduced as an example to facilitate discussion, like aspects of the connector 10 not necessarily associated with the boot configuration. The optical fiber 2 may be associated with a cable and, for convenience, will be referred to as "cable optical fiber 2" below.

With this in mind, and referring back to FIGS. 1 and 2, the connector 10 includes an outer shroud or shell 12, a connector body 14 (also referred to as "connector housing 14") partially within the shell 12, and a ferrule 16 partially within the connector body 14. More specifically, the connector body 14 has a front end 18 and a back end 20. The ferrule 16 has a rear portion retained or otherwise supported within the connector body 14 and a front portion extending beyond the front end 18 of the connector body 14. Additionally, the ferrule 16 includes a ferrule bore 22 extending along a central axis $A_C$, which is generally the same (or at least parallel to) a longitudinal axis $A_L$ of the connector 10.

In the particular embodiment shown, the ferrule 16 is intended to support a stub optical fiber 24, which is a short length of optical fiber. The stub optical fiber 24 may be secured to and polished with the ferrule 16 in a factory so that these steps need not be performed by a technician in the field. Instead, the connector body 14 is designed to accommodate a mechanical splice between a back end of the stub optical fiber 24 and an end of the cable optical fiber 2 (FIG. 3). To this end, the connector 10 further includes a mechanical splice assembly 28 at least partially received within the connector body 14. The mechanical splice assembly 28 is held/supported within the connector body 14 by a sleeve 30 (also referred to as "collar 30") that also supports the rear portion of the ferrule 16. Various mechanical splice assembly designs for field-installable connectors are known. The mechanical splice assembly 28 in the embodiment shown may, for example, be like those described in U.S. Pat. No. 7,280,733, titled "Fiber termination platform for optical connectors," filed Oct. 23, 2006 and U.S. Pat. No. 7,775,726, titled "Remote grip optical fiber connector," filed Mar. 28, 2008 (respectively "the '733 patent" and "the '726 patent"), the disclosures of which are fully incorporated by reference.

Figure 6:
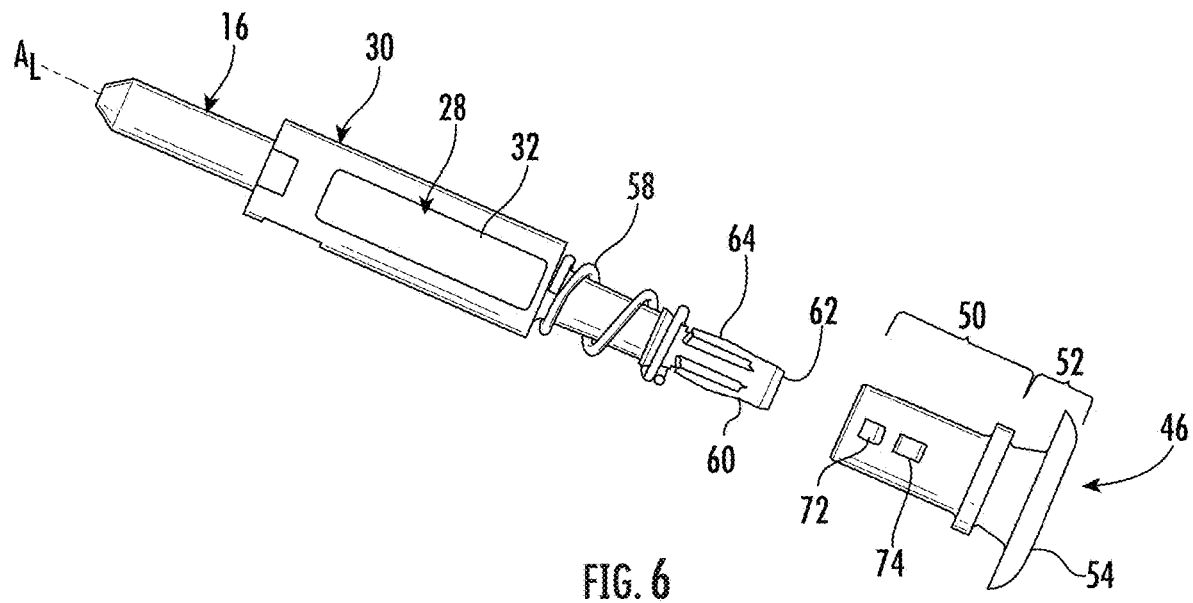
FIG. 6 is a perspective view of a sub-assembly of the fiber optic connector of FIG. 1, wherein the boot is shown removed from the sub-assembly such that FIG. 6 is an exploded view.
Figure 7:
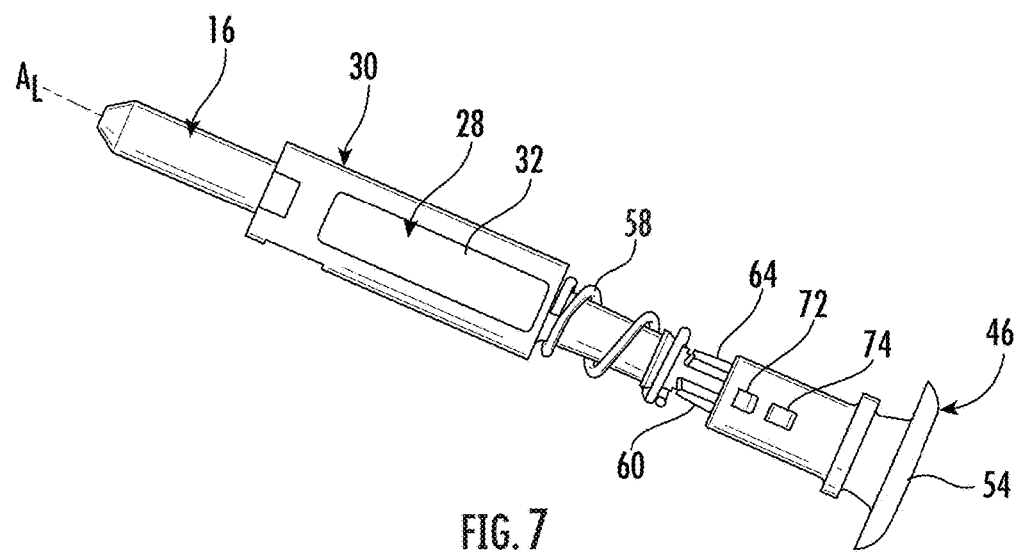
FIG. 7 is a perspective view similar to FIG. 6, but shows the boot being received on a portion of the sub-assembly.

Referring also to FIGS. 6 and 7, the mechanical splice assembly 28 includes an actuating cap 32 that is designed to be pressed downward (i.e., toward the longitudinal axis $A_L$) to actuate a gripping element 34. As described in the '733 patent and the '726 patent, the gripping element 34 may be a sheet of ductile material that is folded to define a hinge and two legs extending upwards. The actuating cap 32 is positioned over the legs, but has an initial position where the legs extend slightly away from each other. The cable optical fiber 2 can be inserted into the back of the connector 10 and advanced to abut the back end of the stub optical fiber 24 in the space between the legs of the gripping element 34. Pushing the actuating cap 32 results in cam bars on an interior of the actuating cap 32 sliding over the legs, urging them legs toward one another. The result is a clamping force that secures the mechanical splice between the stub optical fiber 24 and cable optical fiber 2.

To facilitate pressing the actuating cap 32, the connector 10 may include a dust cap actuator tool 36. Such a tool is described in U.S. Pat. No. 10,185,102, titled "Optical fiber connector with integrated installation tools," filed on Oct. 17, 2017 ("the '102 patent"), the disclosure of which is fully incorporated herein by reference. The dust cap actuator tool 36 includes a lever 38 (or "cap actuator 38") that can be pivoted about a living hinge 40 so that a force concentration element 42 on the lever 38 ultimately presses on the actuating cap 32. The dust cap actuator tool 36 also serves to protect ends of the ferrule 16 and stub optical fiber 24 from dust, debris, and other contaminants prior to use. Again, reference can be made to the '102 patent for additional details and understanding of such a tool.

Still referring to FIGS. 1 and 2, the connector 10 further includes a boot 46 coupled a rear portion 48 ("backbone 48") of the connector body 14. More specifically, a front portion 50 of the boot 46 is disposed within and coupled to the backbone 48 of the connector body 14. The boot 46 also includes a funnel-shaped portion 52 that extends beyond the back end 20 of the connector body 14. The funnel-shaped portion 52 defines a boot back end 54. FIGS. 1 and 2 illustrate the boot 46 in a rearward position. As will be described in greater detail below, the boot 46 may be pushed along the longitudinal axis $A_L$ of the connector 10 to a forward position to assist with retaining the cable optical fiber 2 in the connector 10. Features are provided on the boot 46 so that the boot 46 is coupled to the connector body 14 in both the rearward position and the forward position. Although these aspects can be better appreciated from subsequent figures and will be discussed in greater detail below, an overview of an example installation process for the connector 10 will first be described for context.

Figure 4:
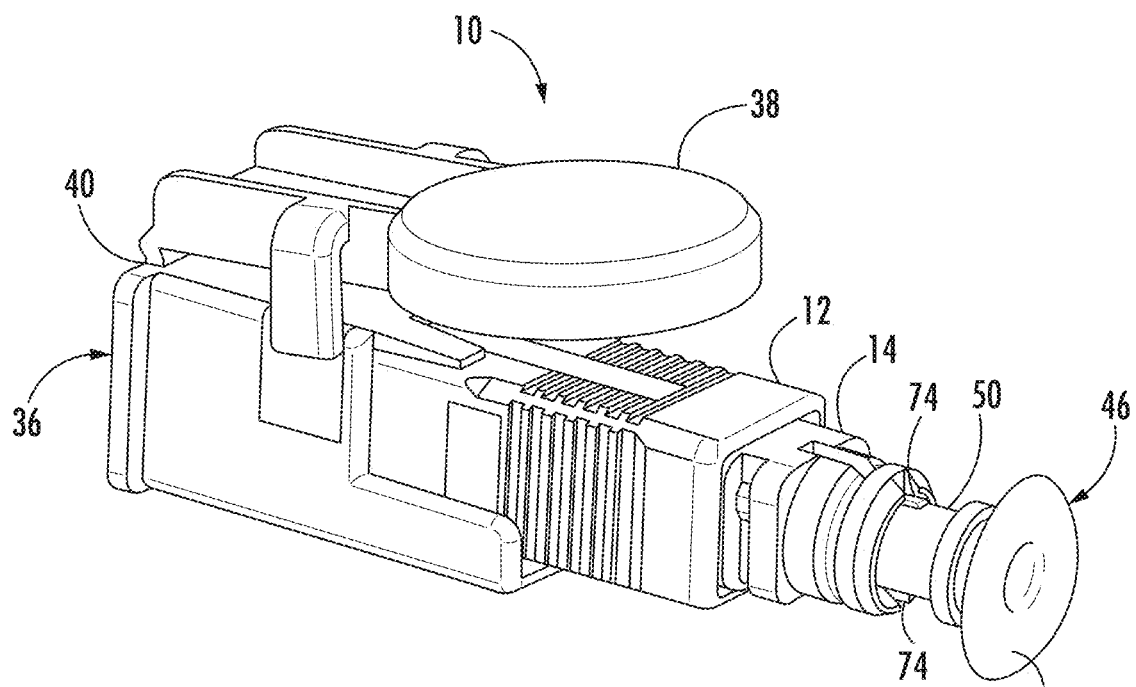
FIG. 4 is a perspective of the fiber optic connector and dust cap actuator tool of FIG. 1 after pivoting a portion of the dust cap actuator tool about a living hinge so that the portion confronts an actuating cap of the fiber optic connector, wherein boot the fiber optic connector is shown in a rearward position.

One step of the process involves preparing the cable optical fiber 2 (FIG. 3) for insertion into the connector 10. This may include, for example, cleaving the cable optical fiber 2 and stripping an appropriate length of coating layer material and/or buffer layer material (if present) to expose an end section of the bare glass portion 4. As illustrated in FIG. 4, the process may also involve folding the lever 38 of the dust cap actuator tool 36 so that the force concentration element 42 is positioned just above the actuating cap 32. This arrangement may make the connector 10 easier to hold, as the technician can place a finger or thumb on a push area of the lever 38 (on one side of the connector 10) and a different finger or thumb on an underside of the dust cap actuator tool 36 (on an opposite side of the connector 10). While holding the connector 10 with one hand between two fingers or between a finger and a thumb, the technician can use his or her other hand to insert the previously-prepared (e.g., stripped and cleaved) cable optical fiber 2 into the connector 10.

Figure 5:
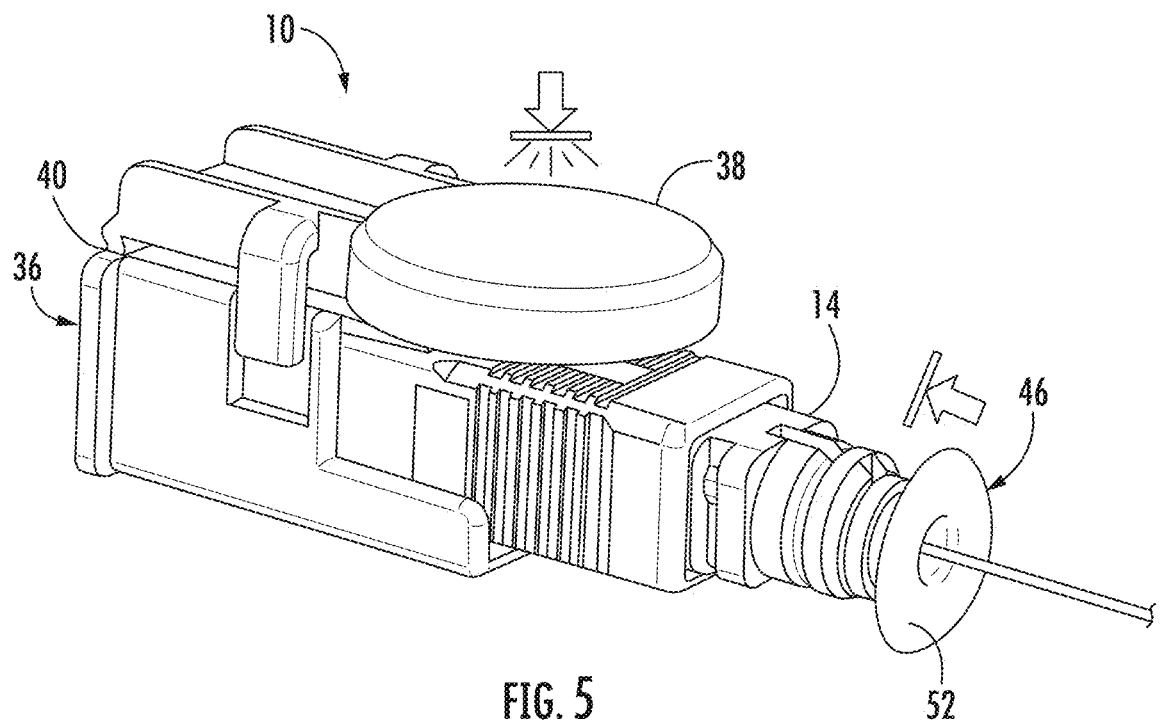
FIG. 5 is a perspective view similar to FIG. 4, but illustrates the dust cap actuator pressing the actuating cap and the boot moved to a forward position.

FIG. 5 illustrates the connector 10 after inserting and securing the cable optical fiber 2. As can be appreciated, the cable optical fiber 2 is first inserted into the connector 10 though the boot back end 54. The exposed end section of the bare glass portion 4 (see FIG. 3) is ultimately advanced into the mechanical splice assembly 28 to abut the stub optical fiber 24. Advancing the cable optical fiber 2 until a bow is formed behind the boot back end 54 helps the technician ensure that contact with the stub optical fiber 24 is established and maintained. The technician can then squeeze the dust cap actuator tool 36 so that the force concentration element 42 on the lever 38 moves the actuating cap 32 downward. As discussed above and in the '102 patent, the result is ultimately a clamping force that secures the mechanical splice between the stub optical fiber 24 and cable optical fiber 2. The arrow and symbol above the connector 10 in FIG. 5 represents how there may be a tactile and, in some embodiments, audible feedback that the actuating cap 32 has been fully actuated.

Figure 5A:
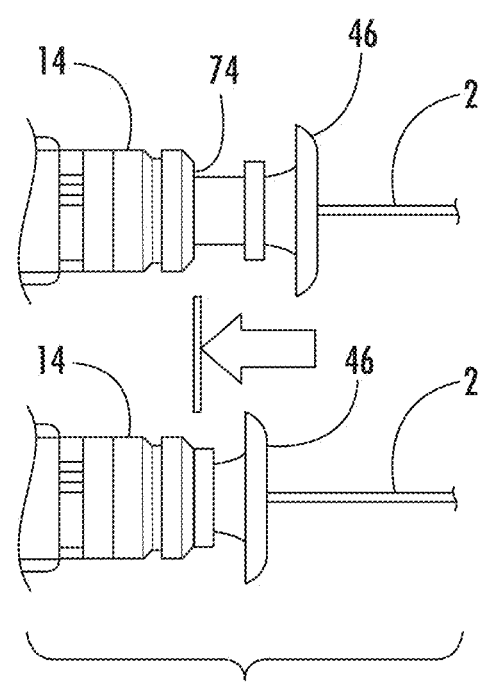
FIG. 5A is a schematic, close-up view showing movement of the boot from the rearward position to the forward position.

FIG. 5 also illustrates the boot 46 pushed to a forward position, which may be performed by the technician after securing the mechanical splice. The movement of the boot 46 from a rearward position to a forward position, as depicted by an arrow, can be best appreciated from the close-up diagrams in FIG. 5A. As with actuation of the lever 38, there may be tactile and potentially audible feedback that the boot 46 has been fully actuated. The dust cap actuator tool 36 may then be removed from the connector 10, as the installation process is now complete. The connector 10 assembled on the cable optical fiber 2 results in a fiber optic cable assembly 56.

Now that a general overview of an example installation process has been described, reference can be made to FIGS. 6 and 7 to better appreciate the structure of the boot 46 and function of its actuation. In particular, FIG. 6 illustrates a sub-assembly of the connector 10 that includes the ferrule 16, sleeve 30, and mechanical splice assembly 28. FIG. 6 also illustrates a spring 58 received on the sleeve 30, and the boot 46 exploded from the sub-assembly. The spring 58 is designed to cooperate with internal structure of the connector body 14 (FIGS. 1 and 2) to bias the sub-assembly relative to the connector body 14. The boot 46 is designed to be received over a portion of the sleeve 30 that is within the connector body 14 when the connector 10 is assembled. More specifically, the sleeve 30 includes a buffer clamping portion 60 proximate to (and defining) a back end 62 of the sleeve 30. The buffer clamping portion 60 houses or otherwise includes structure designed to be actuated when the boot 46 is moved from its rearward position to its forward position. In the embodiment shown, the buffer clamping portion 60 includes walls 64 that are bowed radially outward relative to the longitudinal axis $A_L$ of the connector 10.

FIG. 7 is similar to FIG. 6, but shows the front portion 50 of the boot 46 received over a short length of the buffer clamping portion 60 of the sleeve 30. FIG. 7 corresponds to the boot 46 being in its rearward position. In this position, the walls 64 of the buffer clamping portion 60 remain bowed. Additionally, an internal passage defined within the buffer clamping portion 60 is large enough to accommodate the buffer portion of the cable optical fiber 2 (FIG. 3). This allows the cable optical fiber 3 to be fully inserted into the connector 10 to form the mechanical splice.

As can be appreciated from FIG. 7, when the boot 46 is moved along the longitudinal axis $A_L$ to its forward position, the boot 46 flexes the walls 64 of the buffer clamping portion 60 radially inward. Doing so causes the buffer clamping portion 60 to exert a clamping force against the cable optical fiber 2 that has been inserted into to sleeve 30 (and specifically against the buffer portion 8 of the cable optical fiber 2 within the sleeve 30). These and other buffer clamping mechanisms are described in the '102 patent. Accordingly, reference can be made to the '102 patent for a better understanding of these aspects.

Figure 8:
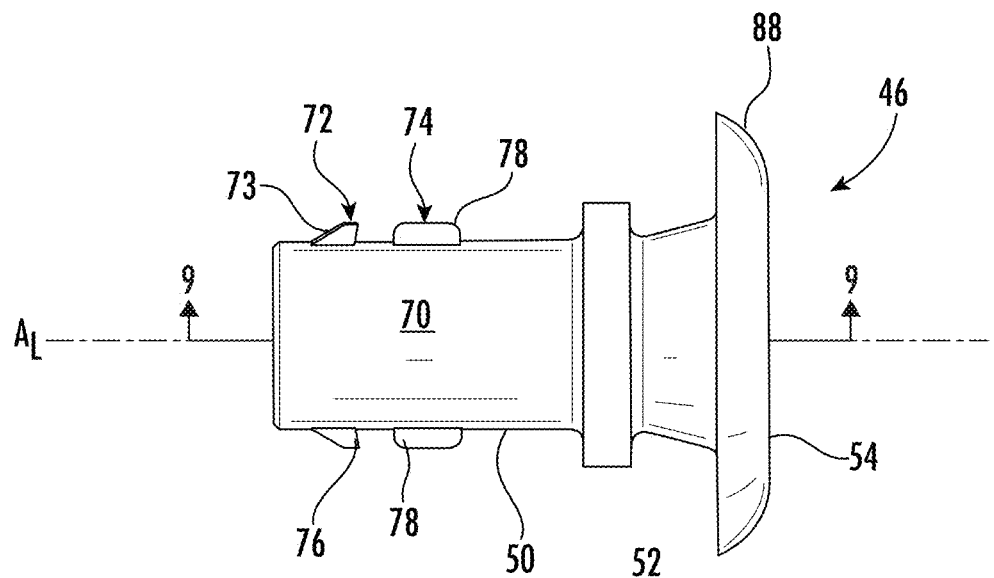
FIG. 8 is a side elevational view of the boot of the fiber optic connector of FIG. 1.
Figure 9:
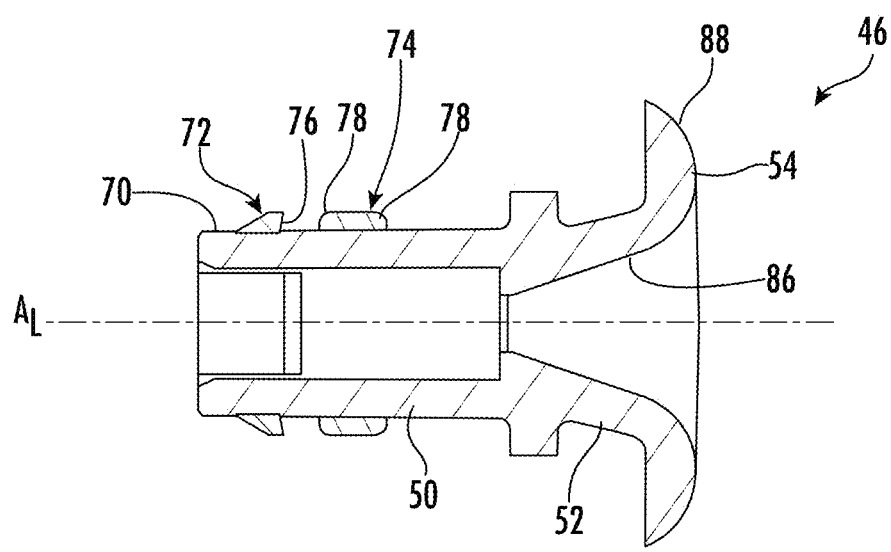
FIG. 9 is a cross-sectional view taken along line 9-9 in FIG. 8.
Figure 11:
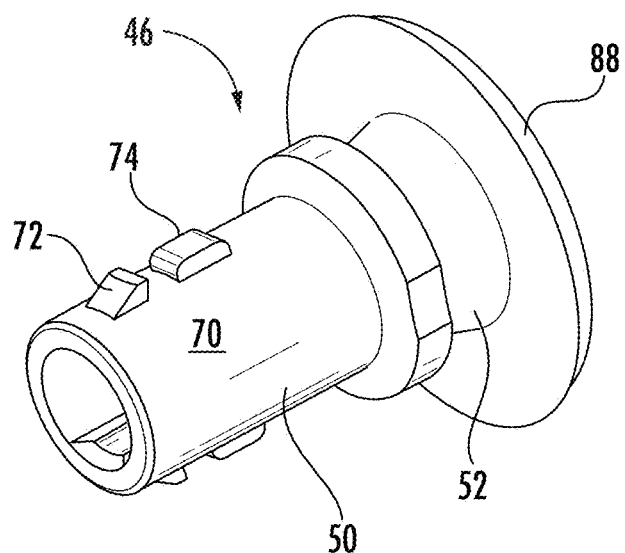
FIG. 11 is a perspective view of the boot of the fiber optic connector of FIG. 1, wherein the boot is shown in isolation.

FIGS. 8, 9, and 11 illustrate the boot 46 in isolation. As can be seen, the boot 46 has a generally tubular configuration and extends along the longitudinal axis $A_L$ (also see FIGS. 1 and 2). The front portion 50 of the boot 46 includes an exterior surface 70, first engagement features 72 extending radially outward from the exterior surface 70 at a first axial location, and second engagement features 74 extending radially outward from the exterior surface at a second axial location. Thus, the second engagement features 74 are spaced from the first engagement features 72 in an axial direction (i.e., in a direction along or parallel to the longitudinal axis $A_L$). In the embodiment shown, there are two of the first engagement features 72 at circumferentially opposite locations. Likewise, there are two of the second engagement features 74 at circumferentially opposite locations. Alternative embodiments may include a different number and/or arrangement of the first engagement features 72 and/or the second engagement features 74.

Figure 10:
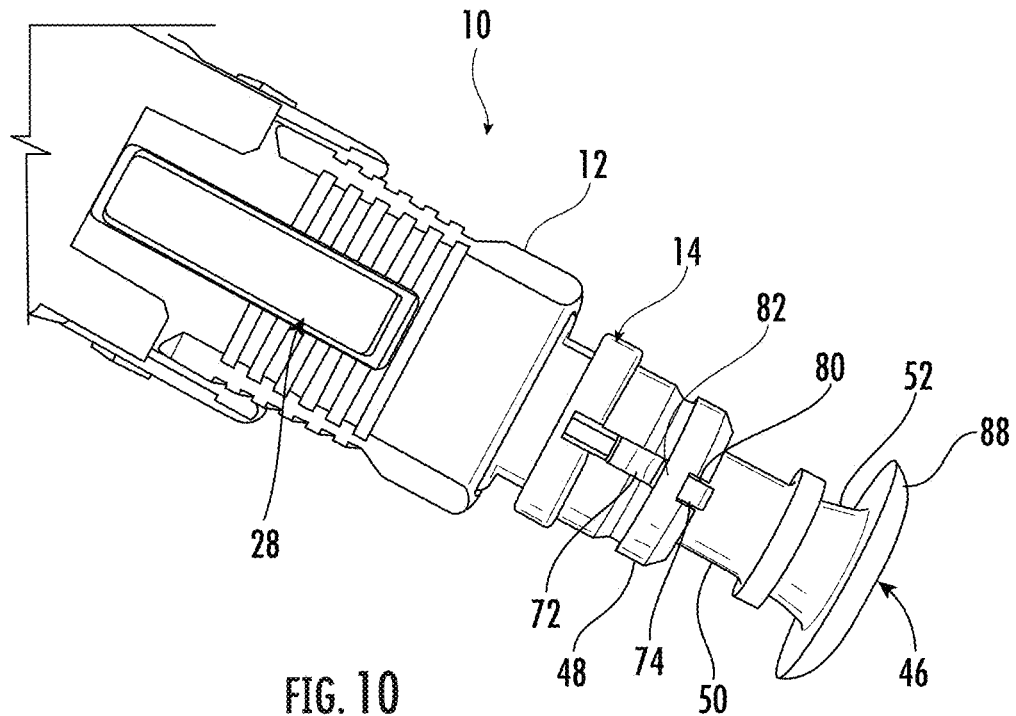
FIG. 10 is a top perspective view showing a rear portion of the fiber optic connector of FIG. 1.

In the embodiment shown, the first engagement features 72 are in the form of detents or catches that define a steep, rearward-facing shoulder 76. The second engagement features 74 are in the form of projections/bumps that have edge regions 78 with a configuration that is more rounded compared to the rearward-facing shoulders 76 of the first engagement features 72. Both the first engagement features 72 and the second engagement features 74 are configured to couple the boot 46 to the backbone 48 of the connector body 14. For example, FIG. 10 illustrates a portion of the connector 10 in an assembled configuration with the boot 46 in its rearward position. The backbone 48 of the connector body 14 includes two slots 80 at circumferentially-opposed locations (only one of the slots 80 can be seen in FIG. 10). The slots 80 accommodate the first engagement features 72 and the second engagement features 74. However, the backbone 48 also includes ribs 82 that span each of the slots 80 (i.e., one rib per slot, although other embodiments are possible). The first engagement features 72 and the second engagement features 74 cooperate with the ribs 82 to couple the boot 46 to the connector body 14.

In particular, to assemble the boot 46 with the connector body 14, the front portion 50 of the boot 46 is inserted over the buffer clamping portion 60 of the sleeve 30 and into the backbone 48 of the connector body 14. The first engagement features 72 on the front portion 50 of the boot 46 are aligned with the slots 80 so that the slots 80 can accommodate the first engagement features 72 and allow such insertion. During the insertion, the first engagement features 72 contact the ribs 82 and cause the ribs 82 to flex outwardly until the first engagement features 72 pass (or "clear") the ribs 82, which then return to their un-flexed state. At this point the boot 46 can be considered as being coupled to the connector body 14, as the rearward-facing shoulders 76 help prevent the boot 46 from being removed. Attempting to remove the boot 46 results in the rearward-facing shoulders 76 contacting the ribs 82, but the steep/pronounced geometry of the rearward-facing shoulders 76 is designed to avoid flexing the ribs 82 outward. Thus, as can be appreciated, the first engagement features 72 cooperate with the ribs 82 to couple the boot 46 to the connector body 14 in the rearward position of the boot 46.

When advancing the boot 46 to its forward position (see FIG. 5), the second engagement features 74 likewise come into contact with the ribs 82 and flex the ribs 82 radially outward. Ultimately the second engagement features 74 pass the ribs 82, which then flex back inward. At this point the boot 46 is in its forward position. The boot 46 is not free to move back to its rearward position (FIG. 10) because sufficient force must be applied to overcome interference between the second engagement features 74 and the ribs 82. Due to the geometry of the second engagement features 74, the force may be significantly less than the force required to overcome interference between the rearward-facing shoulders 76 of the first engagement features 72 and the ribs 82. Nevertheless, the force may be greater than those the boot 46 may experience during normal use and handling of the connector 10. In other words, a conscious effort may be required to move boot 46 from its forward position back to its rearward position. As such, the boot 46 can still be considered as being coupled to the connector body 14 in its forward position. It is just that the coupling is reversible; a conscious effort/force—one beyond normal use of the connector 10—can be applied to reverse the coupling without potential damage to the connector 10.

In some embodiments, to further prevent accidental movement of the boot 46 back to its rearward position, the boot 46 and the connector body 14 may be designed with additional locking features (not shown). For example, the additional locking features may function as a bayonet locking mechanism, whereby the boot 46 can be advanced forward and twisted to be further secured to the connector body 14.

Referring back to FIGS. 8, 9, and 11, the geometry of the funnel-shaped portion 52 of the boot 46 will now be described in further detail. The funnel-shaped portion 52 includes a tapered passage 86 on an interior of the boot 46 and a lip 88 (or "rim 88") on an exterior of the boot 46. The tapered passage 86 and the lip 88 are curved toward each other proximate the boot back end 54 so that the funnel-shaped portion 52 terminates with a rounded configuration. Stated differently, an interior surface that defines the tapered passage 86 and an exterior surface that defines the lip 88 are each convex proximate the boot back end 54. The geometry provides a smooth transition so that an optical fiber (e.g. cable optical fiber 2) can be pushed against the interior surface, bent around the boot back end 54, and even extend along at least a portion of the radially-outward facing, exterior surface without exceeding a predetermined minimum bend radius of the optical fiber. Thus, the boot back end 54 may be at an apex of a dome formed by the curved interior surface and the curved exterior surface.

In some embodiments, proximate the boot back end 54, the tapered passage 86 and the lip 88 may each have a radius of curvature of about 1.5 mm or greater as measured in plane that includes the longitudinal axis $A_L$.

Despite the funnel-shaped portion 52 of the boot 46 flaring radially outward as the funnel-shaped portion 52 extends from the front portion 50 of the boot 46, and despite the lip 88 causing additional length in the radial direction, a maximum outer diameter of the boot 46 may be kept relatively small. For example, in some embodiments, the maximum outer diameter of the boot 46 may be less than 30% larger, less than 25% larger, or even less than 15% larger than a maximum width of the back end 20 of the connector body 14. The maximum outer diameter is defined by the lip 88 and measured in a plane transverse (i.e., perpendicular) to the longitudinal axis $A_L$. The maximum width of the back end 20 of the connector body 14 is likewise measured in a plane transverse to the longitudinal axis $A_L$.

Advantageously, the connector 10 may achieve adequate performance despite the boot 46 also being short in length and being relatively rigid. Unlike convention boots that are formed from an elastomeric material, the boot 46 may be formed from a more rigid plastic such as Ultem®.

Example

Five connectors according to this disclosure were constructed and subjected to side pull tests according to the Telecordia GR-326 standard (February 2010). More specifically, the connectors were each installed on a respective ITU-T G.657.B3 buffered-coated optical fiber. 90-degree side pull tests were performed at 0.55 lb-force and 1.54 lb-force according to the GR-326 standard. All five of the connectors demonstrated satisfactory performance.

Additionally, 135-degree side pull tests were performed at 0.55 lb-force, again according to the GR-326 standard. The table below lists insertion loss values measured during these tests with the side loads applied:

| | Insertion Loss (dB) | | | | Change in Insertion Loss (dB) | | | |
|---|---|---|---|---|---|---|---|---|
| Sample # | 1310 nm | 1490 nm | 1550 nm | 1625 nm | 1310 nm | 1490 nm | 1550 nm | 1625 nm |
| 1 | 0.34 | 0.59 | 0.69 | 0.78 | 0.06 | 0.22 | 0.33 | 0.46 |
| 2 | 0.15 | 0.32 | 0.42 | 0.54 | 0.05 | 0.16 | 0.27 | 0.38 |
| 3 | 0.19 | 0.36 | 0.44 | 0.55 | 0.02 | 0.14 | 0.24 | 0.35 |
| 4 | 0.19 | 0.48 | 0.53 | 0.64 | 0.05 | 0.18 | 0.26 | 0.39 |
| 5 | 0.23 | 0.36 | 0.45 | 0.57 | 0.06 | 0.15 | 0.28 | 0.38 |
| Average | 0.22 | 0.42 | 0.51 | 0.62 | 0.05 | 0.17 | 0.28 | 0.39 |
| Std. Dev. | 0.07 | 0.11 | 0.11 | 0.10 | 0.02 | 0.03 | 0.03 | 0.04 |

The change in initial insertion loss value is the difference between final and initial loss. Using the sample #1 as an example, the initial insertion loss at 1310 nm was 0.28 dB. During the application of the 135-degree side load, the insertion loss increased by 0.06 dB, to an applied load insertion loss value of 0.34 dB.

The are many alternatives and variations that will be appreciated by persons skilled in optical connectivity without departing from the spirit or scope of this disclosure. For example, although the connector 10 described above may be a "field-installable" connector that is based on mechanical splicing principles, the concepts of this disclosure may be applicable to other types of field-installable connectors (e.g., fusion splice connectors, epoxy-and-polish connectors, etc.) or factory-installable connectors. As a specific example of the latter, embodiments are contemplated where the cable optical fiber 2 is inserted into a connector (not shown) until the bare glass portion 4 resides in a ferrule bore (e.g., similar to the ferrule bore 22). The bare glass portion 4 may be secured to the associated ferrule using a bonding agent (e.g., epoxy), as is well-known. In such embodiments, the connector may not include a component like the mechanical splice assembly 28.

Figure 12:
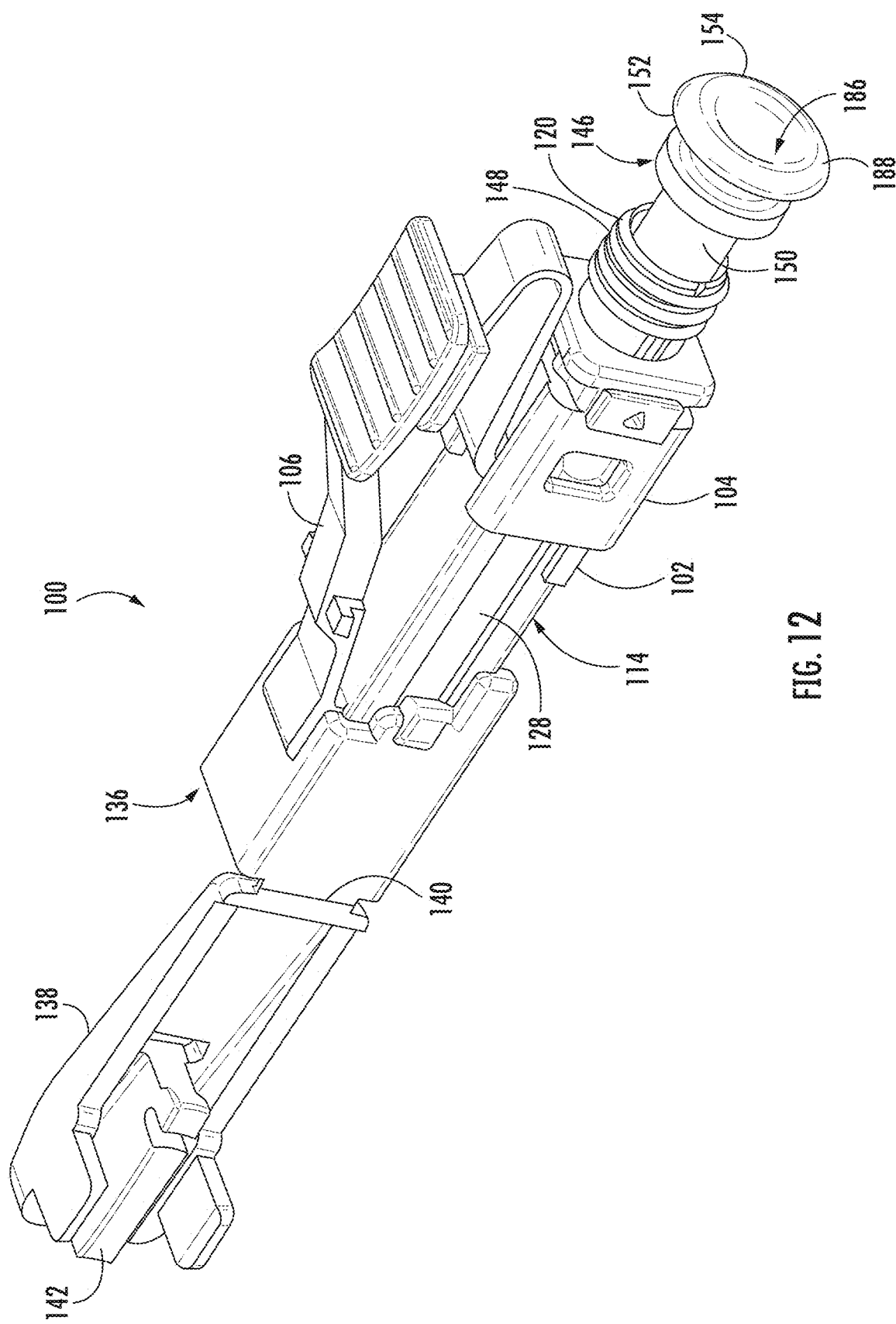
FIG. 12 is a perspective view of another example of a fiber optic connector with a boot according to this disclosure, wherein a dust cap actuator tool is mounted on the fiber optic connector.
Figure 13:
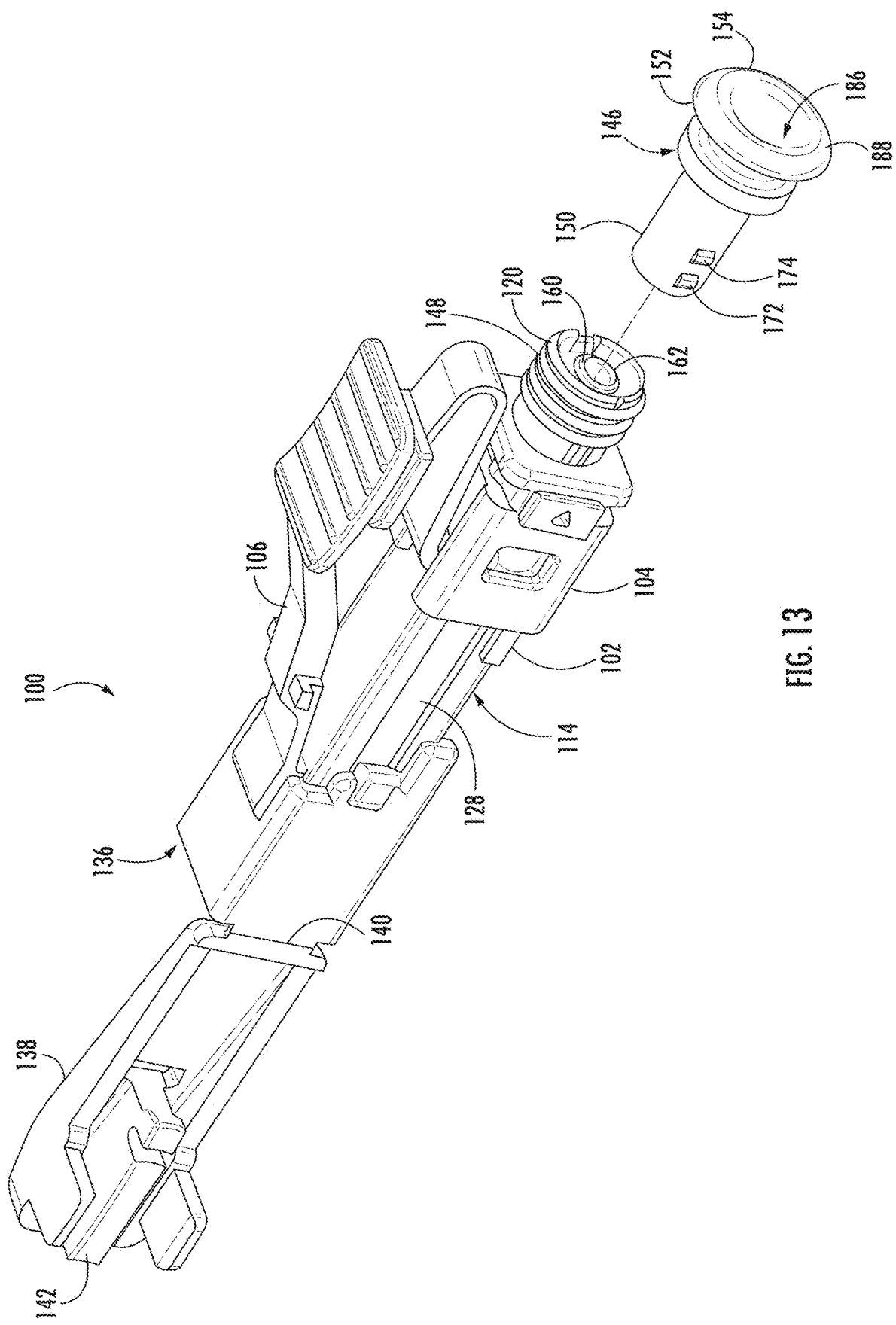
FIG. 13 is a perspective similar to FIG. 12, showing the boot removed from the fiber optic connector.
Figure 14:
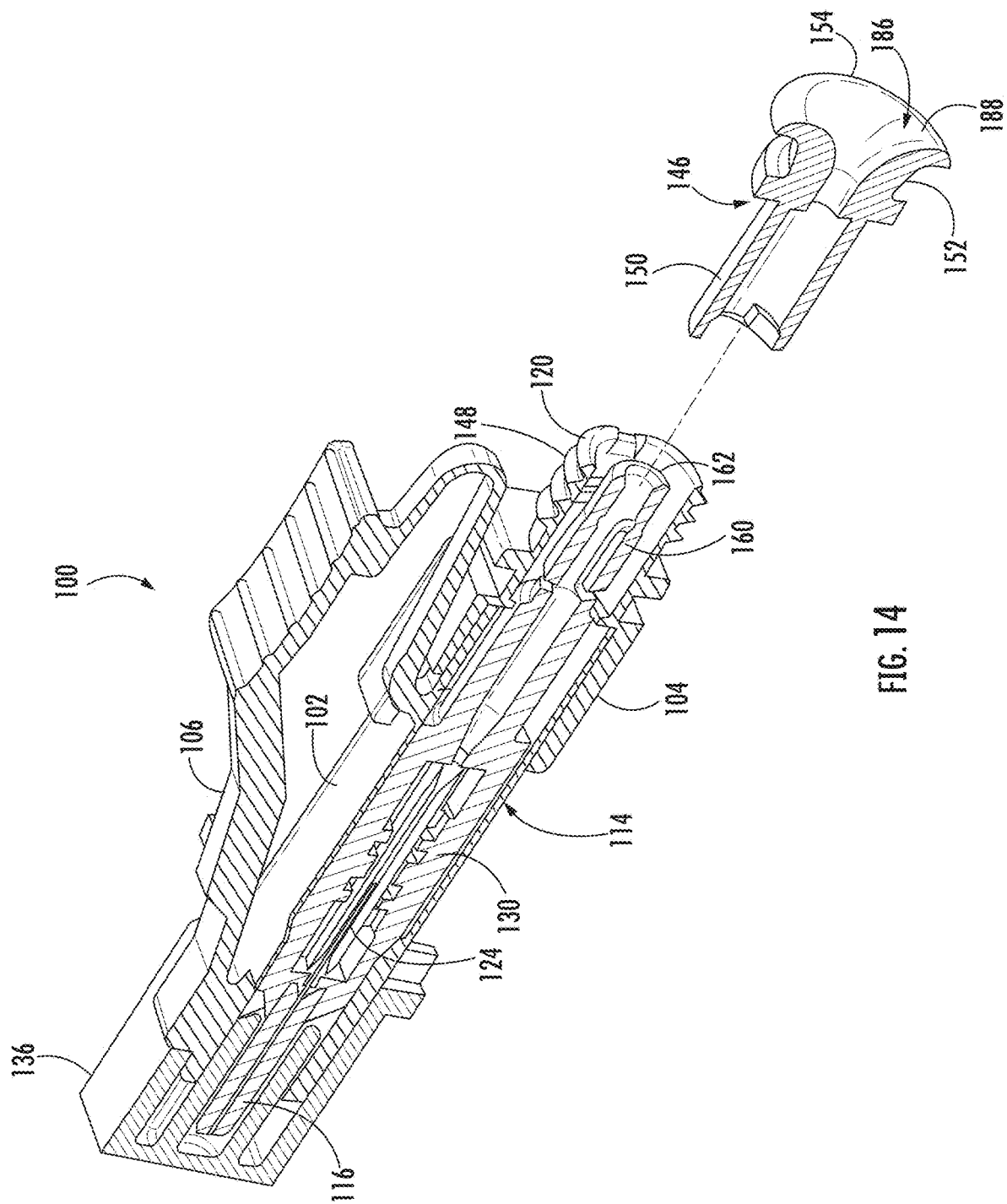
FIG. 14 is a cross-sectional view of the fiber optic connector and boot of FIG. 13.

Additionally, as mentioned above, although the connector 10 is an SC-type connector, this disclosure may be applicable to other connector types. To this end, FIGS. 12-14 illustrate a connector 100 that is an LC-type (e.g., according to IEC 61754-20:2012). A dust cap actuator tool 136 is also shown as being mounted on the connector 100. In general, the connector 100 functions much like the connector 10, at least in terms of aspects introduced by this disclosure.

To this end, like the connector 10, the connector 100 includes a connector body 114 (also referred to as "connector housing 114") that receives a mechanical splice assembly 128. In the embodiment shown, the connector body 114 is defined by a front housing 102 and a back housing 104 that are coupled together. The front housing 102 is generally rectangular in that it defines four general sides between a front and a back of the front housing 102. A latch arm 106 is provided on one of the sides, as is conventional for LC-type connectors. The mechanical splice assembly 128 is received and accessible through an opening provided on an adjacent side of the front housing 102. The dust cap actuator tool 136 includes a lever 138 (or "cap actuator 138") that can be pivoted about a living hinge 140 so that a force concentration element 142 on the lever 138 ultimately presses on the mechanical splice assembly 128.

As shown in FIG. 14, the dust cap actuator tool 136 also serves to protect ends of a ferrule 116 and stub optical fiber 124 from dust, debris, and other contaminants prior to use. The ferrule 116 includes a rear portion retained or otherwise supported within the front housing 102 of the connector body 114 and a front portion extending beyond a front end 118 of the connector body 114. The stub optical fiber 124 is supported by the ferrule 116 and extends into the mechanical splice assembly 128. Again, like the connector 10, the connector 100 also includes a sleeve 130 (or "collar 130") that: supports the rear portion of the ferrule 116, holds the mechanical splice assembly 128 within the front housing 102, and includes a buffer clamping portion 160 proximate to (and defining) a back end 162 of the sleeve 130. Aspects of the mechanical splice assembly 128, sleeve 130, and dust cap actuator tool 136 will not be described in further detail since the principles of operation and other considerations mentioned above for corresponding elements in the connector 10 apply equally to the connector 100.

As shown in FIGS. 12-14, the rear housing 104 defines a rear portion 148 (or "backbone 148") of the connector body 114. The connector 100 also includes a boot 146 that is similar to the boot 46 discussed above. FIG. 12 illustrates a front portion 150 of the boot 146 disposed within and coupled to the backbone 148 of the connector body 114, and a funnel-shaped portion 152 of the boot 146 that extends beyond a back end 120 of the connector body 114. The funnel-shaped portion 152 defines a boot back end 154. Like the boot 46, the boot 146 may be pushed along a longitudinal axis of the connector 100 from a rearward position to a forward position to actuate the buffer clamping portion 160 of the sleeve 130 and thereby assist with retaining a cable optical fiber 2 (FIG. 3) in the connector 100.

FIGS. 13 and 14 illustrate the boot 146 removed from the connector body 114 to better appreciate the features that allow the the boot 146 to be coupled to the connector body 114 in both a rearward position and a forward position. As can be appreciated, the boot 146 may have similar features and a similar shape as the boot 46 discussed in detail above with reference to FIGS. 8, 9, and 11. For example, the front portion 150 of the boot 146 in the embodiment shown includes first and second engagement features 172, 174 similar to the first and second engagement features 72, 74. Additionally, the funnel-shaped portion 152 includes a tapered passage 186 on an interior of the boot 146 and a lip 188 (or "rim 188") on an exterior of the boot 146, similar to the tapered passage 86 and the lip 88 discussed above. The advantages of such a shape that were discussed above may also apply to the embodiment shown in FIGS. 12-14. Indeed, the general principles of operation and other considerations mentioned above with respect to the boot 146 may also be applicable to the embodiment shown in FIGS. 12-14. This additional embodiment is merely provided to show how aspects of the disclosure may be applied to different connector types.

Other embodiments and modifications of the concepts in this disclosure will come to mind to skilled persons having the benefit of the teachings presented in this disclosure. Thus, it is to be understood that the description above and claims that follow are not to be limited to the specific embodiments disclosed; modifications and other embodiments are intended to be included within the scope of the appended claims.

What is claimed is:

1. A fiber optic connector for an optical fiber, the fiber optic connector comprising:
   a connector body having a front end and a back end;
   a ferrule having a rear portion supported within the connector body and a front portion extending beyond the front end of the connector body, wherein the ferrule is configured to support the optical fiber;
   a boot having a front portion within the connector body and a funnel-shaped portion that extends beyond the back end of the connector body and that defines a boot back end, wherein:
      the funnel-shaped portion includes a tapered passage on an interior of the boot and a lip on an exterior of the boot, and
      the tapered passage and the lip are curved toward each other proximate the boot back end so that the funnel-shaped portion terminates with a rounded configuration; and
   a sleeve at least partially positioned within the connector body, wherein the boot is received over a portion of the sleeve within the connector body and the boot in its entirety is configured to move relative to the connector body from a rearward position to a forward position, and wherein the sleeve includes at least one clamping member configured to be actuated by the boot moving from the rearward position to the forward position.

2. The fiber optic connector of claim 1, wherein:
the tapered passage in the funnel-shaped portion of the boot is generally centered about a longitudinal axis of the boot, and
proximate the boot back end, the tapered passage and the lip have a radius of curvature of about 1.5 mm or greater as measured in plane that includes the longitudinal axis.

3. The fiber optic connector of claim 1, wherein the lip on the funnel-shaped portion of the boot defines a maximum outer diameter of the boot that is larger than a maximum width of the back end of the connector body.

4. The fiber optic connector of claim 3, wherein the maximum outer diameter of the boot is less than 25% larger than the maximum width of the back end of the connector body.

5. The fiber optic connector of claim 3, wherein the maximum outer diameter of the boot is less than 15% larger than the maximum width of the back end of the connector body.

6. The fiber optic connector of claim 1, wherein the boot is coupled to the connector body in the forward position.

7. The fiber optic connector of claim 6, wherein the boot is coupled to the connector body in the rearward position.

8. The fiber optic connector of claim 1, wherein:
the connector body comprises a front housing defining the front end of the connector body and a rear housing defining the back end of the connector body;
the front housing and the rear housing are coupled together;
the sleeve is at least partially positioned within the front housing and extends into the rear housing so that the at least one clamping member is positioned within the rear housing.

9. A fiber optic connector for an optical fiber that includes a bare glass portion and a buffer portion, the fiber optic connector comprising:
a connector body having a front end and a back end;
a ferrule having a rear portion supported within the connector body and a front portion extending beyond the front end of the connector body;
a stub optical fiber secured to the ferrule;
a mechanical splice assembly at least partially received within the connector body, wherein the stub optical fiber extends from the rear portion of the ferrule and terminates within the mechanical splice assembly;
a sleeve at least partially positioned within the connector body and configured to receive the buffer portion of the optical fiber, wherein the sleeve includes at least one clamping member configured to apply a clamping force to the buffer portion of the optical fiber upon actuation when the buffer portion of the optical fiber is disposed in the sleeve; and
a boot received over a portion of the sleeve within the connector body, wherein the boot in its entirety is configured to move relative to the connector body from a rearward position to a forward position to actuate the at least one clamping member, the boot having a front portion within the connector body and a funnel-shaped portion that extends beyond the back end of the connector body and that defines a boot back end, wherein:
the funnel-shaped portion includes a tapered passage on an interior of the boot and a lip on an exterior of the boot, and
the tapered passage and the lip are curved toward each other proximate the boot back end so that the funnel-shaped portion terminates with a rounded configuration.

10. The fiber optic connector of claim 9, wherein the boot is coupled to the connector body in the forward position.

11. The fiber optic connector of claim 10, wherein the boot is coupled to the connector body in the rearward position.

12. The fiber optic connector of claim 9, wherein the mechanical splice assembly is at least partially received within the sleeve in the connector body.

13. The fiber optic connector of claim 9, wherein:
the connector body comprises a front housing defining the front end of the connector body and a rear housing defining the back end of the connector body;
the front housing and the rear housing are coupled together;
the sleeve is at least partially positioned within the front housing and extends into the rear housing so that the at least one clamping member is positioned within the rear housing.

14. A fiber optic cable assembly, comprising:
a cable optical fiber; and
a fiber optic connector installed on the cable optical fiber, the fiber optic connector comprising:
a connector body having a front end and a back end;
a ferrule having a rear portion supported within the connector body and a front portion extending beyond the front end of the connector body; and
a boot having a front portion within the connector body and a funnel-shaped portion that extends beyond the back end of the connector body and that defines a boot back end, wherein:
the funnel-shaped portion includes a tapered passage on an interior of the boot and a lip on an exterior of the boot, and
the tapered passage and the lip are curved toward each other proximate the boot back end so that the funnel-shaped portion terminates with a rounded configuration;
wherein:
the fiber optic connector further comprises a sleeve at least partially positioned within the connector body,
the cable optical fiber includes a buffer portion extending through the boot back end and into the sleeve,
the sleeve includes at least one clamping member applying a clamping force to the buffer portion of the optical fiber, and
the boot is received over a portion of the sleeve within the connector body and causing the at least one clamping member to apply the clamping force, and
further wherein the boot in its entirety is movable relative to the connector body between a forward position in which the boot causes the at least one clamping member to apply the clamping force and a rearward position in which the boot does not cause the at least one clamping member to apply the clamping force.

15. The fiber optic cable assembly of claim 14, wherein the cable optical fiber includes a bare glass portion secured to the ferrule.

16. The fiber optic cable assembly of claim 14, further comprising:
a mechanical splice assembly at least partially received within the connector body, wherein the cable optical fiber extends into the fiber optic connector via the boot back end and terminates in the mechanical splice assembly; and a stub optical fiber secured to the ferrule, wherein the stub optical fiber extends from the rear portion of the ferrule and into the mechanical splice assembly to abut the cable optical fiber, and wherein the mechanical splice assembly applies a clamping force to secure a mechanical splice between the stub optical fiber and the cable optical fiber.

17. The fiber optic cable assembly of claim 14, wherein the boot is coupled to the connector body in the forward position and the rearward position.

\* \* \* \* \*